United States Patent [19]

Henke et al.

[11] 4,236,376
[45] Dec. 2, 1980

[54] ARRANGEMENT FOR REGULATING SUPERCHARGER AIR PRESSURE

[75] Inventors: Ulrich Henke, Alsdorf; Reinhard Meyer, Grevenbroich, both of Fed. Rep. of Germany

[73] Assignee: Pierburg GmbH & Co. KG, Neuss, Fed. Rep. of Germany

[21] Appl. No.: 37,755

[22] Filed: May 10, 1979

[30] Foreign Application Priority Data

May 22, 1978 [DE] Fed. Rep. of Germany ....... 2822207

[51] Int. Cl.³ .......................................... F02B 37/00
[52] U.S. Cl. ...................................... 60/602; 251/28
[58] Field of Search ................. 60/600, 601, 602, 603; 251/28

[56] References Cited

U.S. PATENT DOCUMENTS

| 2,351,873 | 6/1944 | Parker | 251/28 X |
| 3,172,420 | 3/1965 | Brown et al. | 251/28 X |
| 3,270,951 | 9/1966 | Reed | 251/28 X |

FOREIGN PATENT DOCUMENTS 2362133 6/1975 Fed. Rep. of Germany ............. 60/602

Primary Examiner—Michael Koczo
Attorney, Agent, or Firm—Haseltine, Lake & Waters

[57] ABSTRACT

An arrangement for regulating supercharger air pressure in a combustion engine operated with exhaust gas supercharge which equipped with an exhaust gas turbosupercharger, consisting of a supercharger and an exhaust gas turbine. The regulating device is a valve controlling an exhaust gas bypass to the exhaust gas turbine. The valve has a pressure unit divided by a diaphragm into two chambers. One side of the diaphragm is charged with supercharger air pressure, and the other side is loaded by a spring. The two chambers are connected by a calibrated opening in the diaphragm. Another valve connects the chamber holding the spring to the atmosphere and has the form of a nonreturn ball valve. The preloading of the spring of the nonreturn ball valve may be adjustable.

2 Claims, 1 Drawing Figure

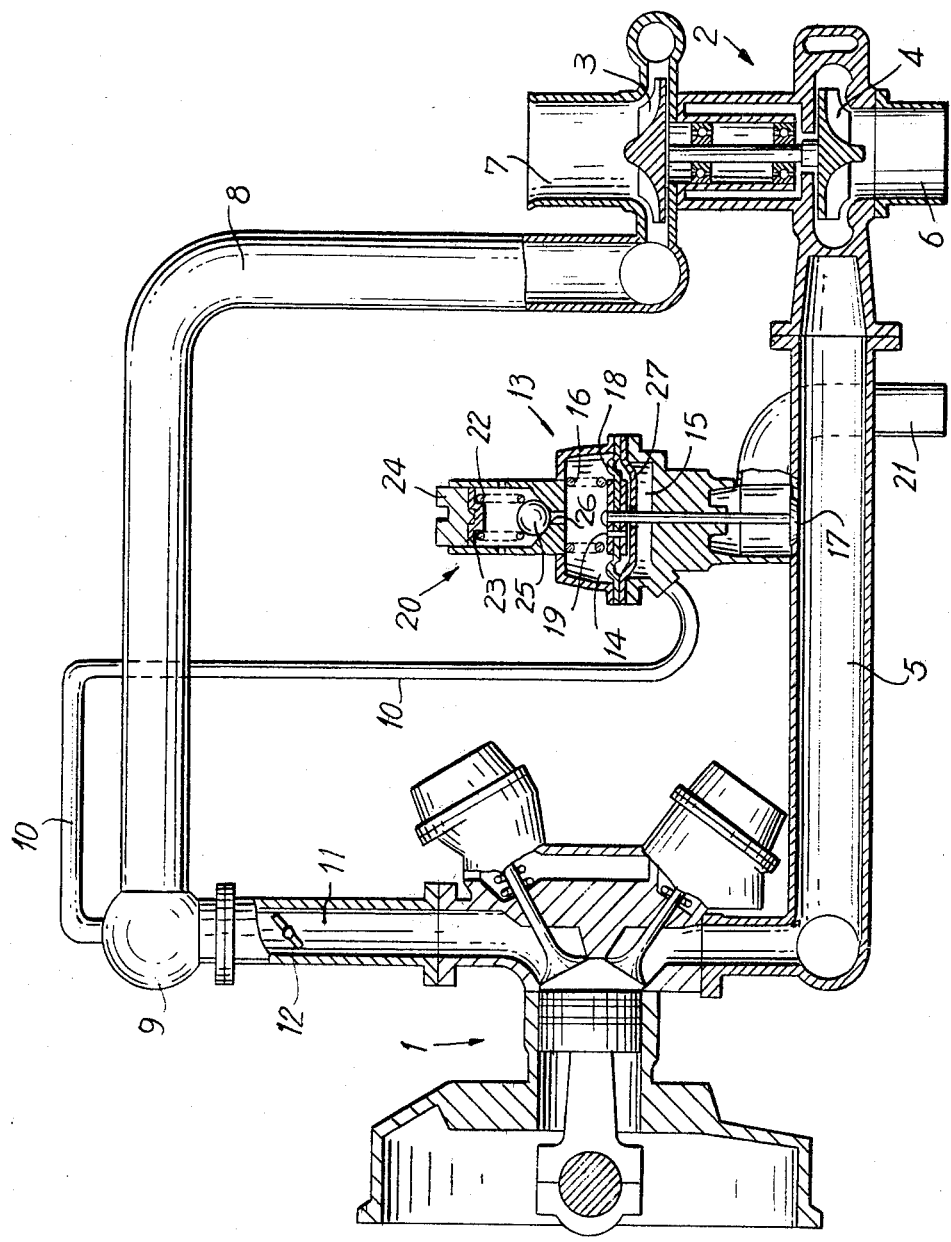

ARRANGEMENT FOR REGULATING SUPERCHARGER AIR PRESSURE

BACKGROUND OF THE INVENTION

The present invention relates to an arrangement for regulating the supercharger air pressure in a combustion engine operated with exhaust gas supercharge, which is equipped with an exhaust gas turbosupercharger consisting of a supercharger and an exhaust gas turbine; the regulating arrangement consists of a valve controlling an exhaust gas bypass to the exhaust gas turbine; this valve has a pressure unit which is divided by a diaphragm into two chambers, with the diaphragm on one side exposed to the supercharger air pressure, and on the other side to the force of a spring.

Vehicle engines require a maximum torque during maximum acceleration at low engine speeds. To achieve this, the exhaust gas supercharger is constructed so that it produces high turbine speeds even at low engine speeds. At high engine speeds, part of the exhaust gas flow is no longer delivered to the exhaust gas turbosupercharger so that the supercharger air pressure is limited.

Such an arrangement is known from the German Laid-Open Document 23 62 133. It discloses a valve controlling the exhaust gas bypass to the exhaust gas turbine; this valve has a pressure unit which is divided by a diaphragm into two chambers, with the diaphragm being exposed to supercharger air pressure in the opening direction and to force the compression spring in the closing direction. In one embodiment the diaphragm receives a controlled supercharger pressure in order to shift the opening point of the exhaust gas bypass valve towards a higher supercharger pressure. In a second embodiment the membrane is exposed to a controlled supercharger air pressure in the opening direction, and to the force of a compression spring and atmospheric pressure in the other direction. Both designs require a spring of high initial force—combined with a small valve design—to keep the valve closed until reaching the desired upper supercharger pressure. After attaining this supercharger pressure, the spring must be capable of opening the exhaust gas bypass valve and to open and close it even with small pressure changes on the supercharger pressure side in order to continuously adjust to the desired supercharger pressure.

This means that the spring, with the desired small height, has a high initial spring force when installed and a very gentle spring characteristic for regulating. These opposite requirements cannot be met by a spring produced by mass production.

Hence it is an object of the present invention to provide an exhaust gas control valve which meets the requirements regarding opening point and regulating behavior within narrow limits, and allows the use of a simple commercial compression spring.

Another object of the present invention is to provide an arrangement of the foregoing character which is substantially simple in construction and may be economically fabricated.

A further object of the present invention is to provide an arrangement, as described, which may be readily maintained in service and which has a substantially long operating life.

SUMMARY OF THE INVENTION

The objects of the present invention are achieved by an arrangement of the above-described type by (a) calibrated opening, passing through the diaphragm, for connecting both chambers of the pressure unit, (b) a control valve connecting the chamber holding the spring to atmosphere and being constructed as a nonreturn ball valve.

Since this arrangement attempts a pressure balance on both sides of the diaphragm and the adjusting force is formed by the difference of the pressure forces of the two chambers, it is possible to use a spring of low spring constant and low spring force. This low spring force also has the advantage that in case of a crack in the diaphragm the exhaust gas counterpressure is able to open the exhaust gas bypass valve, preventing thermal overloading of the engine by overcharging. The diaphragm is protected by a thermal insulator. The opening point of the exhaust gas bypass valve can be shifted by making the preload of the control valve spring variable.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

A sectional schematic view showing the essential elements and their interrelationships, in accordance with an embodiment of the present invention.

DESCRIPTION OF THE PREFERRED EMBODIMENTS

Referring to the drawing, a combustion engine 1 is equipped with an exhaust gas turbosupercharger 2 which consists of a supercharger 3 and an exhaust gas turbine 4. The exhaust gas turbine 4 is connected to the combustion engine 1 by an exhaust gas line 5 and has an exhaust line 6 to take away the exhaust gasses. The supercharger 3 is connected with an intake pipe 7 and a supercharger air line 8. A supercharger pressure line 10 and an intake pipe 11 branch off from a distributor 9. Inside the intake pipe 11 is a throttle flap 12 which can be actuated at will by a gas pedal (not shown). The supercharger pressure line 10 leads to a pressure unit 13 which has two chambers 14, 15. These chambers are formed by a diaphragm 18 which cooperates with a compression spring 16 and is connected to an exhaust gas bypass valve 17. The chamber 15 is charged with supercharger air pressure via line 10. Chambers 14, 15 are interconnected via a calibrated opening 19. Chamber 14 can be connected to atmosphere via a control valve 20 which is a nonreturn ball valve. The exhaust gas line 5 has an exhaust gas duct 21 controlled by valve 17. This duct discharges downstream of the exhaust gas turbine 4 into line 6.

The arrangement operates as follows:

At low supercharger pressure, the entire exhaust gas flow should charge the exhaust gas turbine 4. Therefore, valve 17 remains closed. The force of spring 16 is selected so that in this operating range it exceeds the force of the exhaust gas counterpressure on the head of valve 17. The supercharger pressure in both chambers 14, 15 adjusts itself via opening 19 to the same valve. Upon reaching a pressure limit, the preselected supercharger pressure where the valve 17 should open, control valve 20 is opened to atmosphere. The pressure in chamber 14 drops below the pressure in chamber 15 so that diaphragm 18, by the force produced by the pressure differential, moves valve 17 in the opening direction. The cross section of opening 19 is smaller than the outflow opening of valve 20. Since valve 20 remains open as long as the supercharger pressure limit is exceeded, the pressure in chamber 14 remains lower than the pressure in chamber 15, since a smaller air quantity flows in than flows out. Since the spring constant of spring 16 is low, valve 17 will respond to small changes in supercharger air pressure. Hence the supercharger air pressure is regulated to the set limit.

This limit and hence the opening point of exhaust gas bypass valve 17 can be set on the control valve 20 which is a nonreturn ball valve. For this purpose, the pre-loading of compression spring 22 located inside valve 20 is adjustable via a head 23 and a screw 24. Valve 20 has a ball 25 which with its seat forms an opening cross section 26 which can be varied between limits.

Without further analysis, the foregoing will so fully reveal the gist of the present invention that others can, by applying current knowledge, readily adapt it for various applications without omitting features that, from the standpoint of prior art, fairly consistutes essential characteristics of the generic or specific aspects of this invention, and therefore, such adaptations should and are intended to be comprehended within the meaning and range of equivalence of the following claims.

What is claimed is:

1. An arrangement for regulating the supercharger air pressure in a combustion engine operated with exhaust gas supercharge and equipped with an exhaust gas turbosupercharger, comprising: a supercharger and an exhaust gas turbine, said regulating arrangement comprising a first valve controlling an exhaust gas bypass to said exhaust gas turbine; said first valve having a pressure unit and diaphragm means dividing said pressure unit into two chambers; one side of said diaphragm means being charged with supercharger air pressure; a first spring for loading the other side of said diaphragm means; calibrated opening means passing through said diaphragm means for interconnecting said two chambers; and a second valve for connecting one of said chambers holding said first spring to atmosphere, said second valve comprising a nonreturn ball valve.

2. An arrangement as defined in claim 1 including a second spring in said second valve, and means for adjusting the pre-loading of said second spring.

* * * * *